(12) United States Patent
Graham et al.

(10) Patent No.: US 11,102,930 B2
(45) Date of Patent: Aug. 31, 2021

(54) THRESHING/SEPARATING DEVICE HAVING TINED ACCELERATOR AND/OR AXIAL ROTOR ARRANGEMENT

(71) Applicant: Amadas Industries, Inc., Suffolk, VA (US)

(72) Inventors: Jonathan T. Graham, Suffolk, VA (US); Joel S. Peele, Jr., Gates, NC (US); Shawn T. Lane, Franklin, VA (US); Junius W. White, Hobbsville, NC (US)

(73) Assignee: Amadas Industries, Inc., Suffolk, VA (US)

( * ) Notice: Subject to any disclaimer, the term of this patent is extended or adjusted under 35 U.S.C. 154(b) by 352 days.

(21) Appl. No.: 16/233,067

(22) Filed: Dec. 26, 2018

(65) Prior Publication Data

US 2019/0191628 A1 Jun. 27, 2019

Related U.S. Application Data

(60) Provisional application No. 62/610,394, filed on Dec. 26, 2017.

(51) Int. Cl.
*A01D 29/00* (2006.01)
*A01F 12/10* (2006.01)
(Continued)

(52) U.S. Cl.
CPC .............. *A01F 12/10* (2013.01); *A01D 29/00* (2013.01); *A01F 7/06* (2013.01); *A01F 7/067* (2013.01);
(Continued)

(58) Field of Classification Search
CPC ........ A01D 17/02; A01D 17/14; A01D 17/16; A01D 19/02; A01D 2023/022; A01D 29/00; A01D 33/02; A01D 33/04; A01D 33/08; A01D 80/02; A01D 12/10; A01D 12/12; A01D 12/18; A01D 12/22; A01F 7/00–70; A01F 11/00–08
See application file for complete search history.

(56) References Cited

U.S. PATENT DOCUMENTS 1,749,040 A * 3/1930 Livermon .............. A01F 12/22
460/141
2,040,689 A * 5/1936 Duhain .................. A01D 80/02
56/400

(Continued)

*Primary Examiner* — Adam J Behrens
(74) *Attorney, Agent, or Firm* — Shaddock Law Group, PC

(57) ABSTRACT

An axial threshing/separating system having at least one spring tined accelerator cylinder, in where the accelerator cylinder includes a plurality of double torsional spring tine cylinder elements extending from the spring tined accelerator cylinder; and one or more spring tined axial rotors, in where each of the spring tined axial rotors includes a plurality of double torsional spring tine rotor elements extending from each of the spring tined axial rotors, in where each of the spring tined axial rotors is aligned such that a respective longitudinal axis of each spring tined axial rotor is substantially coplanar and substantially parallel to a respective longitudinal axis of each other spring tined axial rotor, and wherein a longitudinal axis of at least one spring tined accelerator cylinder is substantially perpendicular to the longitudinal axis of each spring tined axial rotor.

13 Claims, 17 Drawing Sheets

(51) Int. Cl.
*A01F 11/00* (2006.01)
*A01F 7/06* (2006.01)
*A01F 12/22* (2006.01)
*A01D 80/02* (2006.01)

(52) U.S. Cl.
CPC .............. *A01F 11/00* (2013.01); *A01F 12/22* (2013.01); *A01D 80/02* (2013.01)

(56) References Cited

U.S. PATENT DOCUMENTS

| | | | | | |
|---|---|---|---|---|---|
| 2,364,303 | A | * | 12/1944 | Martin | A01D 80/02 56/400 |
| 2,974,668 | A | * | 3/1961 | Witzel | A01F 7/06 460/65 |
| 3,099,347 | A | * | 7/1963 | Dahlquist | A01D 80/02 198/692 |
| 3,203,429 | A | * | 8/1965 | Gawreluk | A23N 15/10 460/63 |
| 3,548,580 | A | * | 12/1970 | Krauss | A01D 80/02 56/400 |
| 3,645,339 | A | * | 2/1972 | Williams | A01D 29/00 171/61 |
| 4,136,507 | A | * | 1/1979 | Hobbs | A01D 29/00 56/126 |
| 4,145,866 | A | * | 3/1979 | Zweegers | A01D 80/02 56/400 |
| 4,611,605 | A | * | 9/1986 | Hall | F21S 41/37 460/80 |
| 5,042,243 | A | * | 8/1991 | Doering | A01D 80/02 56/400 |
| 5,138,826 | A | * | 8/1992 | Hobbs | A01D 29/00 460/126 |
| 5,205,114 | A | * | 4/1993 | Hobbs | A01D 29/00 460/126 |
| 5,980,382 | A | * | 11/1999 | Brantley | A01F 11/00 171/26 |
| 6,129,629 | A | * | 10/2000 | Dammann | A01F 7/06 460/67 |
| 2001/0039202 | A1 | * | 11/2001 | Brantley | A01F 12/442 460/132 |
| 2002/0045469 | A1 | * | 4/2002 | Schwersmann | A01F 7/06 460/70 |
| 2002/0122350 | A1 | * | 9/2002 | White | B01F 7/022 366/172.1 |
| 2003/0032465 | A1 | * | 2/2003 | Schwersmann | A01F 7/06 460/69 |
| 2008/0295476 | A1 | * | 12/2008 | Bertino | A01D 29/00 56/122 |
| 2015/0237805 | A1 | * | 8/2015 | Suen | A01F 12/22 460/16 |
| 2018/0249634 | A1 | * | 9/2018 | Morris | A01F 7/062 |

\* cited by examiner

THRESHING/SEPARATING DEVICE HAVING TINED ACCELERATOR AND/OR AXIAL ROTOR ARRANGEMENT

CROSS-REFERENCE TO RELATED APPLICATIONS

This patent application claims the benefit of U.S. Patent Application Ser. No. 62/610,394, filed Dec. 26, 2017, the entire disclosure of which is incorporated herein by reference.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

NOTICE OF COPYRIGHTED MATERIAL

The disclosure of this patent document contains material that is subject to copyright protection. The copyright owner has no objection to the reproduction by anyone of the patent document or the patent disclosure, as it appears in the Patent and Trademark Office patent file or records, but otherwise reserves all copyright rights whatsoever. Unless otherwise noted, all trademarks and service marks identified herein are owned by the applicant.

BACKGROUND OF THE PRESENT DISCLOSURE

1. Field of the Present Disclosure

The present disclosure relates generally to the field of threshing/separating devices. More specifically, the presently disclosed systems, methods, and/or apparatuses relates to a threshing/separating device having a spring tined accelerator cylinder and a spring tined axial rotor arrangement for the harvest of peanuts or related root-type crops.

2. Description of Related Art

It is generally known that peanut and other crop harvesting devices dig the peanut pods or other root-type crops from the ground, shake dirt or other debris from the crop, and thresh the crop so that the peanut pods are separated from the vines. Following separation, the harvested peanuts or other crops are conveyed to bins or other carriers for removal from the field. Typically, the harvest process starts by pulling one or more blades through the earth by a tractor or other methods to cut through the roots of the plant or vines, loosen the surrounding soil, and invert the crop so that it can be later harvested. Inverted root-type crops lay in bundles which often contain the crop itself, vines, dirt, debris, rocks, and other foreign materials collectively referred to as a crop mat. Care must be taken to control the shaking action so that dirt and debris are all that is removed from the peanut vines.

When the crop is ready for harvest, a harvesting device is advanced through the field where the previously dug and inverted peanut vines are drawn into the header portion (gathering mechanism) of the harvesting device and are moved towards the threshing portion of the device. During the conveyor process, the crop is shaken so that dirt and other debris are removed from the peanut vines. The internal conveying process can be performed many ways. One way is by the use of one or more rotating cylinders to convey or feed the crop along concave floors (a structure or device that commonly works in conjunction with rotating cylinder(s) or rotor(s) to direct he flow of a crop mat while often providing a secondary benefit of sifting or separating crop or debris from the crop mat through the use of specifically designed holes or perforations in the concave structure(s). Concaves can be both fixed to limit movement or allowed to move about their longitudinal axis) within the harvester. Although it is commonly understood that rotating cylinders are used for internal conveying or feeding, they can have more than a single purpose. Having a multipurpose rotation cylinder requires careful design, orientation, and other characteristics making each rotating cylinder unique and special. Furthermore, there are rotating cylinders that are distinctly unique in their specific functions so that they are often referred to as rotors. A rotor is a rotating cylinder that is operably mounted in the harvester to thresh and separate peanut pods or other crops away from their vines. The separated product is then conveyed to a bin or other short-term storage before being removed from the field for further processing. Rotors positioned in an orientation that is substantially parallel to direction of travel of the harvester are referred to as axial rotors.

Any discussion of documents, acts, materials, devices, articles, or the like, which has been included in the present specification is not to be taken as an admission that any or all of these matters form part of the prior art base or were common general knowledge in the field relevant to the present disclosure as it existed before the priority date of each claim of this application.

BRIEF SUMMARY OF THE PRESENT DISCLOSURE

Typical harvesting devices can have many shortcomings however, the presently disclosed system is an advancement or improvement over previous harvesting technologies.

In various exemplary, non-limiting embodiments, the axial threshing (where the peanut pods are detached from the crop mat) or separating (removing peanut pods from the crop mat) system of the presently disclosed systems, methods, and/or apparatuses utilizes a spring tined accelerator cylinder and/or one or more spring tined axial rotors in the harvesting process. A spring tined accelerator cylinder comprises of the multiple double torsional spring tined cylinder elements. Whereas a spring tined axial rotor comprises of the multiple double torsional spring tined rotor elements.

In various exemplary, non-limiting embodiments, the feed system of the presently disclosed threshing/separating device utilizes one or more unique, preconditioning cylinder(s) that are used to pre-condition (the act of using the preconditioning cylinder(s) to turn the non-uniform crop mat originally ingested into the harvester into a more even and consistent crop mat flow for further processing by the accelerator cylinder). Preconditioning cylinders are typically transversely mounted, meaning they are substantially perpendicular to the direction of travel of the harvester and commonly extend from one side of the harvester toward the opposing side. The accelerator cylinders are typically transversely mounted, meaning they are also substantially perpendicular to the direction of travel of the harvester and commonly extend from one side of the harvester toward the opposing side just forward of the inlet (the entrance into a rotor otherwise known as a nose) of one or more, main spring tined axial rotors. Other than feeding, the primary objective for this rotating accelerator cylinder is to accelerate an even crop mat into one or more spring tined axial rotors. The use of double torsional spring tine cylinder elements on the accelerator cylinder makes this feeding system unique among any other axial rotor feeding systems. Other designs for example use a drag type chain conveyor or flighted cylinder to feed one or a pair of axial rotors. A unique aspect of the disclosed system is the use of spring elements. Spring elements, as they are referred to throughout this documentation, should be more clearly understood as, any device or apparatus that has the ability to progressively or incrementally apply more force to a crop mat or other opposing objects as the double torsional spring tine is deflected. Another characteristic of the spring element is its ability to deflect without sustaining damage or permanent deformation itself. A spring having a torsional type construction which are commonly made of a material that has one or more features typically formed in the shape of a helix or coil with tangentially protruding tines. When the torsional tines are subjected to an external force they deflect and return when the force is removed. A spring element consists of mentioned spring, a fastening device and mount (supporting structure used to affix element(s)).

The use of other styles of feed cylinders are incompatible, or at the very least, greatly inefficient in handling peanuts or similar root type crops. Peanut crop can have a very high vine tensile strength. Many inter-twined vines, and root mass with clusters of peanut pods, make up the crop mat drawn into and ingested by a peanut harvester. In addition, the peanut crop is dug from the ground prior to the harvesting process. In return, this means an effective peanut harvester must have the ability to handle large amounts of foreign materials such as dirt, rocks, roots, or other subsoil debris or foreign materials.

A spring tined accelerator cylinder is far superior in its ability to handle foreign materials all while being gentle and efficient enough to handle delicate peanut pods while minimizing any damaging affects to the pods themselves. The use of double torsional spring tine cylinder elements on a spring tined accelerator cylinder engage the crop mat through a piercing action which allows the harvester to efficiently and effectively propel the crop mat for further processing. Along the harvesting process, if an inconsistent (light or heavy) crop mat is ingested by the machine, the double torsional spring tine cylinder elements or double torsional spring tine rotor elements are able to apply progressive force to the crop mat without damage and continue to propel the crop mat without impeding flow. Being able to propel the crop mat through a harvester without machine or crop damage, is critical to a well-designed machine.

The accelerator cylinders convey the peanut or other crop mats toward and/or into one or more spring tined axial rotors. The spring tined axial rotors provide improved threshing and separating where the peanut pods are detached from and then removed from the crop mat. When utilizing more than one axial rotor, a symmetrical inverse of the primary rotor is often employed. In multi-axial rotor configurations, the longitudinal axes of the rotors often lie on the same plane and are parallel with respect to one another. Another unique aspect of an axial rotor is its inlet, which is distinct in it is are conical in shape and has auger styled flighting segments which aids in feeding the crop mat into the rotor from one or more spring tined accelerator cylinder.

Axial spring threshing elements are attached or coupled to the perimeter of the rotors. The spring tined axial rotor utilizes one or more double torsional spring tine rotor elements with various spacing and patterns along a perimeter of the spring tined axial rotor. Unlike a rigid threshing element, a double torsional spring tine rotor element allows flexibility in the harvesting process when a progressive force needs to be applied to the crop mat. Without double torsional spring tine cylinder elements or double torsional spring tine rotor elements, damage to a conventional styled system using rigid elements is imminent. During the threshing operation, it is important for the separating elements to keep materials, especially foreign materials, moving through the harvester so they can be properly processed and expelled. Failure to maintain a positive flow of material is likely to cause crop and machine damage, subsequently requiring the harvester to be shut down, inspected, and/or repaired. If a traditional harvester, one that employs rigid elements sustains failure to its rigid elements, then the materials would stall, causing damage to this area of the device. In contrast, the double torsional spring tine cylinder elements and double torsional spring tine rotor elements of the present disclosure, will flex around materials as needed while still imparting positive movement to the materials, then allowing the double torsional cylinder elements and double torsional spring tine rotor elements to return to their natural position, undamaged. This greatly minimizes harvest downtime and/or machine damage.

The spring rate, placement, and configuration of the double torsional spring tine cylinder elements and double torsional spring tine rotor elements provides improved harvesting benefits. In various exemplary, non-limiting embodiments, the double torsional spring tine rotor elements are oriented in a pattern or series of patterns along the perimeter or portions of the perimeter of the main rotor core. The pattern of the double torsional spring tine rotor elements are based on the direction of rotation of the rotor. The position, spacing, and geometry of the double torsional spring tine rotor elements are unique in that they allow a more natural flow or movement of the crop mat along the rotor's axis.

In various exemplary, non-limiting embodiments, the double torsional spring tine rotor elements are staggered in a helical arrangement. A side view of the spring tined axial rotor illustrates a staggered element pattern (compared to adjacent helices) creating more coverage of double torsional spring tine rotor elements throughout the rotor(s).

In various exemplary, non-limiting embodiments, the double torsional spring tine rotor elements are independent double torsional spring tine rotor elements of a double torsional spring type construction.

Accordingly, the presently disclosed systems, methods, and/or apparatuses separately and optionally provide an axial threshing/separating system that is capable of threshing tough crop mats from the delicate peanut pods, while discarding various foreign materials.

The presently disclosed systems, methods, and/or apparatuses separately and optionally provide an axial threshing/separating system incorporating a new spring tined, axial rotor design.

The presently disclosed systems, methods, and/or apparatuses separately and optionally provide an axial threshing/separating system incorporating a double torsional spring tine cylinder elements and double torsional spring tine rotor element.

The presently disclosed systems, methods, and/or apparatuses separately and optionally provide an axial threshing/ separating system that can handle continuous debris such as rocks, roots, and other various, common sub-soil items.

These and other aspects, features, and advantages of the presently disclosed systems, methods, and/or apparatuses are described in or are apparent from the following detailed description of the exemplary, non-limiting embodiments of the presently disclosed systems, methods, and/or apparatuses and the accompanying figures. Other aspects and features of embodiments of the presently disclosed systems, methods, and/or apparatuses will become apparent to those of ordinary skill in the art upon reviewing the following description of specific, exemplary embodiments of the presently disclosed systems, methods, and/or apparatuses in concert with the figures. While features of the presently disclosed systems, methods, and/or apparatuses may be discussed relative to certain embodiments and figures, all embodiments of the presently disclosed systems, methods, and/or apparatuses can include one or more of the features discussed herein. Further, while one or more embodiments may be discussed as having certain advantageous features, one or more of such features may also be used with the various embodiments of the systems, methods, and/or apparatuses discussed herein. In similar fashion, while exemplary embodiments may be discussed below as device, system, or method embodiments, it is to be understood that such exemplary embodiments can be implemented in various devices, systems, and methods of the presently disclosed systems, methods, and/or apparatuses.

Any benefits, advantages, or solutions to problems that are described herein with regard to specific embodiments are not intended to be construed as a critical, required, or essential feature(s) or element(s) of the presently disclosed systems, methods, and/or apparatuses or the claims.

BRIEF DESCRIPTION OF THE SEVERAL VIEWS OF THE DRAWINGS

As required, detailed exemplary embodiments of the presently disclosed systems, methods, and/or apparatuses are disclosed herein; however, it is to be understood that the disclosed embodiments are merely exemplary of the presently disclosed systems, methods, and/or apparatuses that may be embodied in various and alternative forms, within the scope of the presently disclosed systems, methods, and/or apparatuses. The figures are not necessarily to scale; some features may be exaggerated or minimized to illustrate details of particular components. All figures shown are for representational purposes and elements of varying lengths and weights may be used depending on various conditions. Furthermore, specific structural and functional details disclosed herein are not to be interpreted as limiting, but merely as a basis for the claims and as a representative basis for teaching one skilled in the art to employ the presently disclosed systems, methods, and/or apparatuses.

The exemplary embodiments of the presently disclosed systems, methods, and/or apparatuses will be described in detail, with reference to the following figures, wherein like reference numerals refer to like parts throughout several views, and wherein.

DETAILED DESCRIPTION OF EXEMPLARY EMBODIMENTS OF THE PRESENT DISCLOSURE

Figure 1:
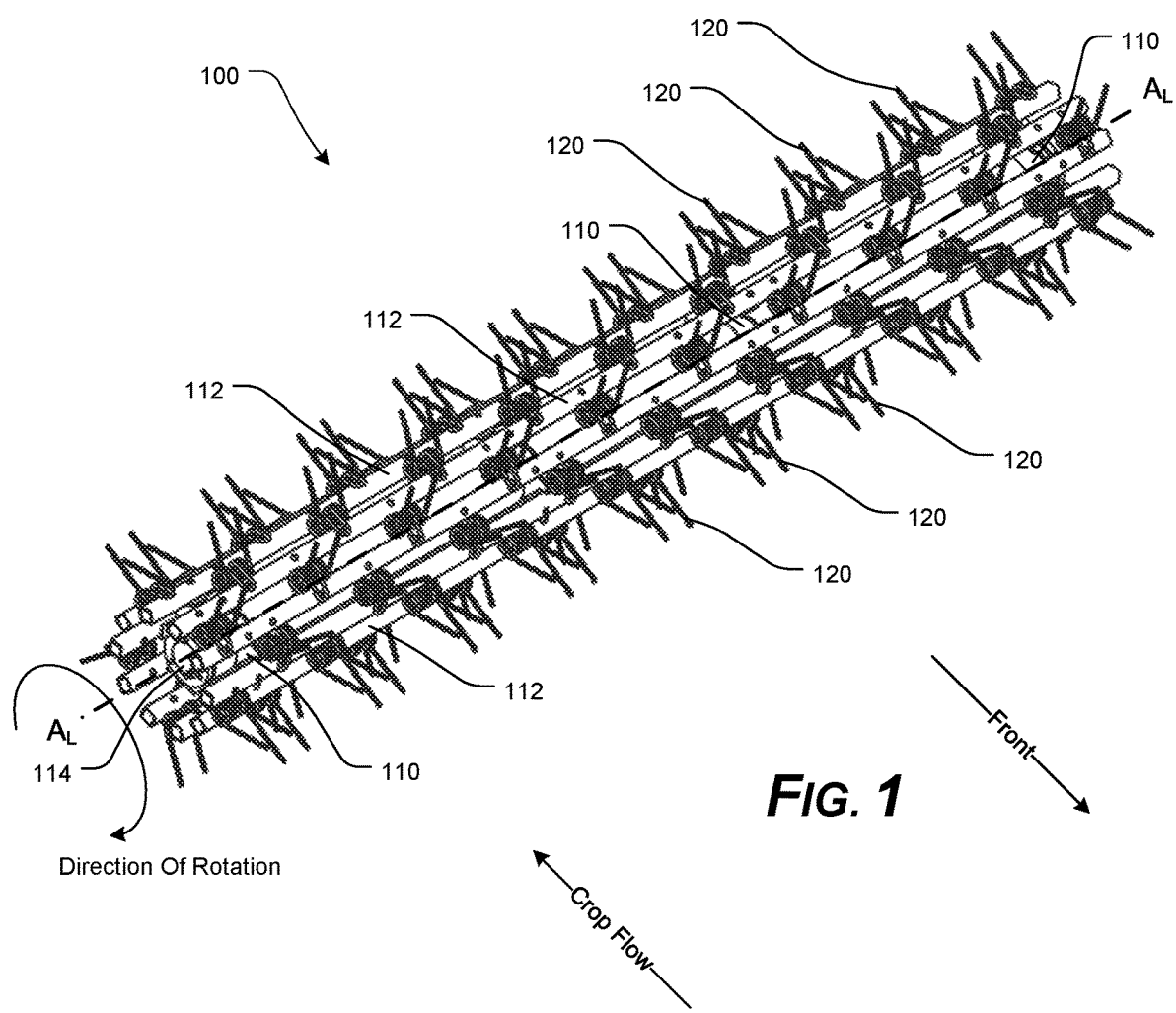
FIG. 1 illustrates a perspective view of an exemplary embodiment of a spring tined accelerator cylinder, according to the presently disclosed systems, methods, and/or apparatuses. Fastening devices omitted for clarity.
Figure 2:
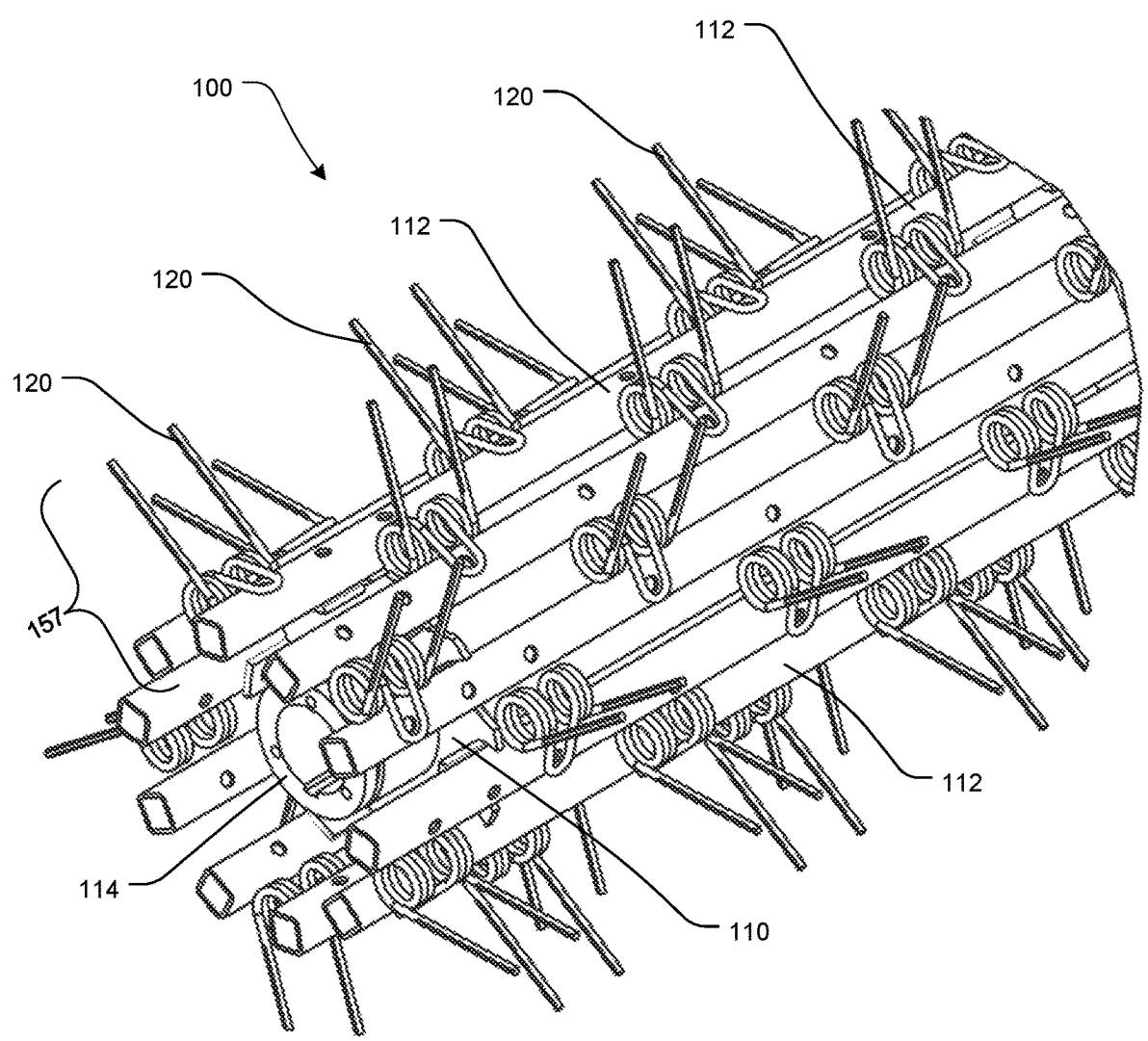
FIG. 2 illustrates a more detailed, perspective view of a portion of an exemplary embodiment of a spring tined accelerator cylinder, according to the presently disclosed systems, methods, and/or apparatuses.
Figure 3:
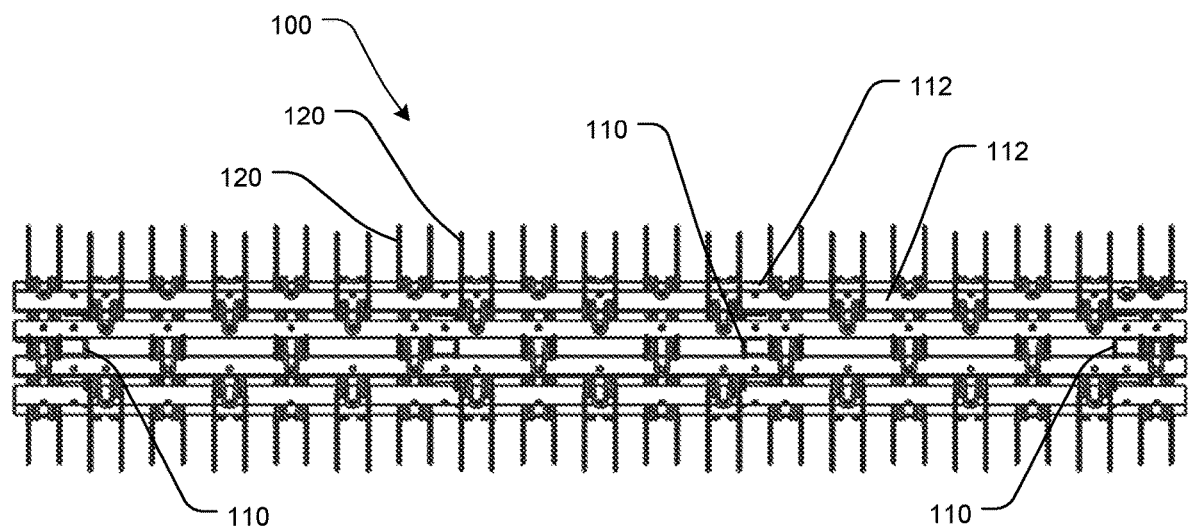
FIG. 3 illustrates a top view of an exemplary embodiment of a spring tined accelerator cylinder, according to the presently disclosed systems, methods, and/or apparatuses.
Figure 4:
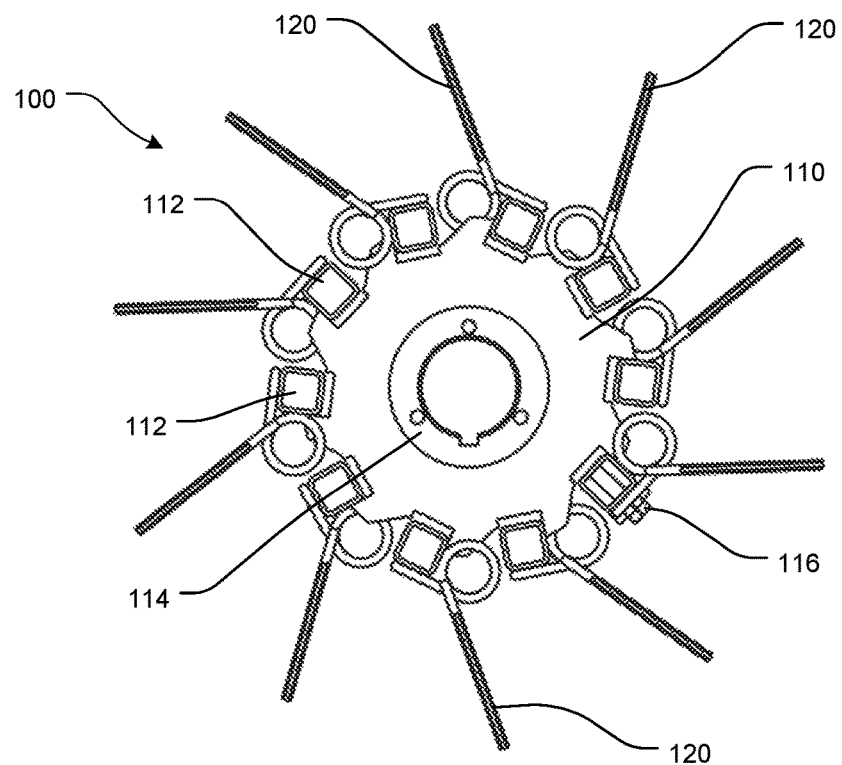
FIG. 4 illustrates an end view of an exemplary embodiment of a spring tined accelerator cylinder, according to the presently disclosed systems, methods, and/or apparatuses.

For simplicity and clarification, the design factors and operating principles of the axial threshing/separating components and/or systems according to the presently disclosed systems, methods, and/or apparatuses are explained with reference to various exemplary embodiments of axial threshing/separating components and/or systems according to the presently disclosed systems, methods, and/or apparatuses. The basic explanation of the design factors and operating principles of the axial threshing/separating components and/or systems is applicable for the understanding, design, and operation of the axial threshing/separating components and/or systems of the presently disclosed systems, methods, and/or apparatuses. It should be understood that the axial threshing/separating components and/or systems can be adapted to many applications where axial threshing/separating components and/or systems can be used.

As used herein, the word "may" is meant to convey a permissive sense (i.e., meaning "having the potential to"), rather than a mandatory sense (i.e., meaning "must"). Unless stated otherwise, terms such as "first" and "second" are used to arbitrarily distinguish between the exemplary embodiments and/or elements such terms describe. Thus, these terms are not necessarily intended to indicate temporal or other prioritization of such exemplary embodiments and/or elements.

The term "coupled", as used herein, is defined as connected, although not necessarily directly, and not necessarily mechanically. The terms "a" and "an" are defined as one or more unless stated otherwise.

Throughout this application, the terms "comprise" (and any form of comprise, such as "comprises" and "comprising"), "have" (and any form of have, such as "has" and "having"), "include", (and any form of include, such as "includes" and "including") and "contain" (and any form of contain, such as "contains" and "containing") are used as open-ended linking verbs. It will be understood that these terms are meant to imply the inclusion of a stated element, integer, step, or group of elements, integers, or steps, but not the exclusion of any other element, integer, step, or group of elements, integers, or steps. As a result, a system, method, or apparatus that "comprises", "has", "includes", or "contains" one or more elements possesses those one or more elements but is not limited to possessing only those one or more elements. Similarly, a method or process that "comprises", "has", "includes" or "contains" one or more operations possesses those one or more operations but is not limited to possessing only those one or more operations.

It should also be understood that the terms "threshing/separating system", "accelerator cylinder", "axial rotor", and "tine" are used for basic explanation and understanding of the operation of the systems, methods, and apparatuses of the presently disclosed systems, methods, and/or apparatuses. Therefore, the terms "threshing/separating system", "accelerator cylinder", "axial rotor", and "tine" are not to be construed as limiting the systems, methods, and apparatuses of the presently disclosed systems, methods, and/or apparatuses.

For simplicity and clarification, the axial threshing/separating components and/or systems of the presently disclosed systems, methods, and/or apparatuses will be described as being used in conjunction with a peanut harvesting device. However, it should be understood that these are merely exemplary embodiments of the axial threshing/separating components and/or systems and are not to be construed as limiting the presently disclosed systems, methods, and/or apparatuses. Thus, the axial threshing/separating components and/or systems of the presently disclosed systems, methods, and/or apparatuses may be utilized in conjunction with the harvesting of any appropriate crop.

Turning now to the appended drawing figures, FIGS. 1-4 illustrate certain elements and/or aspects of an exemplary embodiment of the spring tined accelerator cylinder 100, FIGS. 5-7, and 9-11 illustrate certain aspects of exemplary double torsional spring tines 120, FIGS. 12-17 illustrate certain elements and/or aspects of an exemplary embodiment of a spring tined axial rotor 130, and FIGS. 18-22 illustrate certain elements and/or aspects of an exemplary embodiment of an axial threshing/separating system, according to the presently disclosed systems, methods, and/or apparatuses.

In certain illustrative, non-limiting embodiment(s) of the presently disclosed systems, methods, and/or apparatuses, the spring tined accelerator cylinder 100 comprises a plurality of elongated support elements 112 or lateral support bars arranged in a substantially circular fashion about support element disc(s) 110. A cylinder core 114 (a centralized supporting structure of a cylinder or rotor) extends from one or more of the elongated support elements 112 and is configured so as to allow a rotational force to be applied to the spring tined accelerator cylinder 100.

Figure 5:
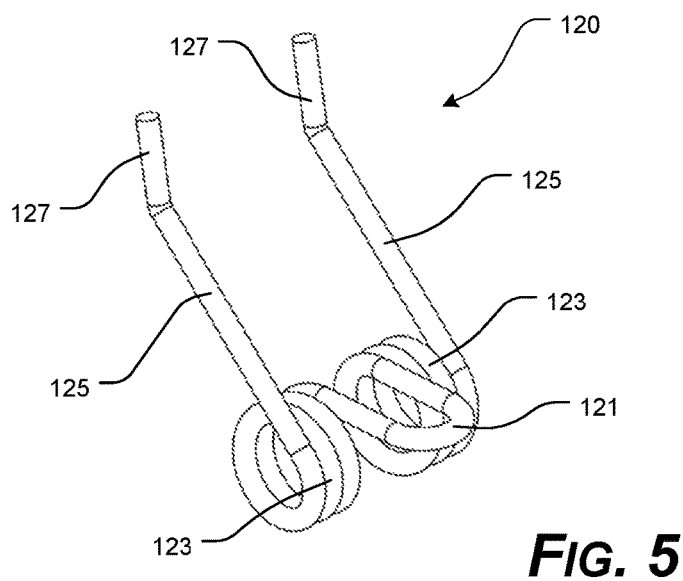
FIG. 5 illustrates a perspective view of an exemplary double torsional spring tine, according to the presently disclosed systems, methods, and/or apparatuses.
Figure 6:
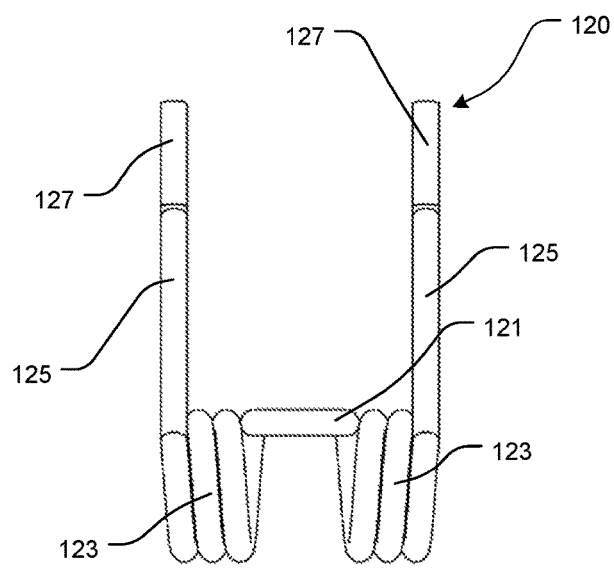
FIG. 6 illustrates a front view of an exemplary double torsional spring tine, according to the presently disclosed systems, methods, and/or apparatuses.
Figure 7:
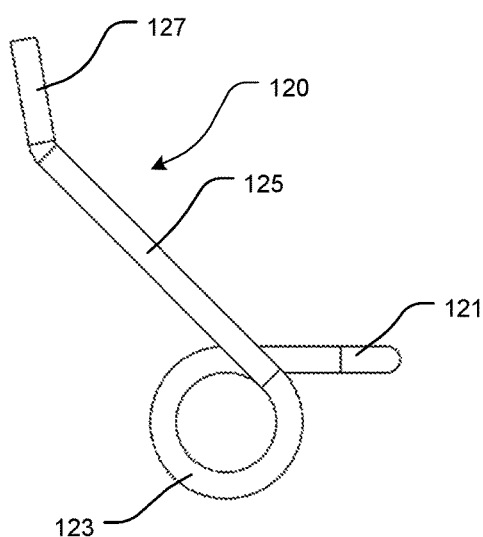
FIG. 7 illustrates a side view of an exemplary double torsional spring tine, according to the presently disclosed systems, methods, and/or apparatuses.
Figure 8:
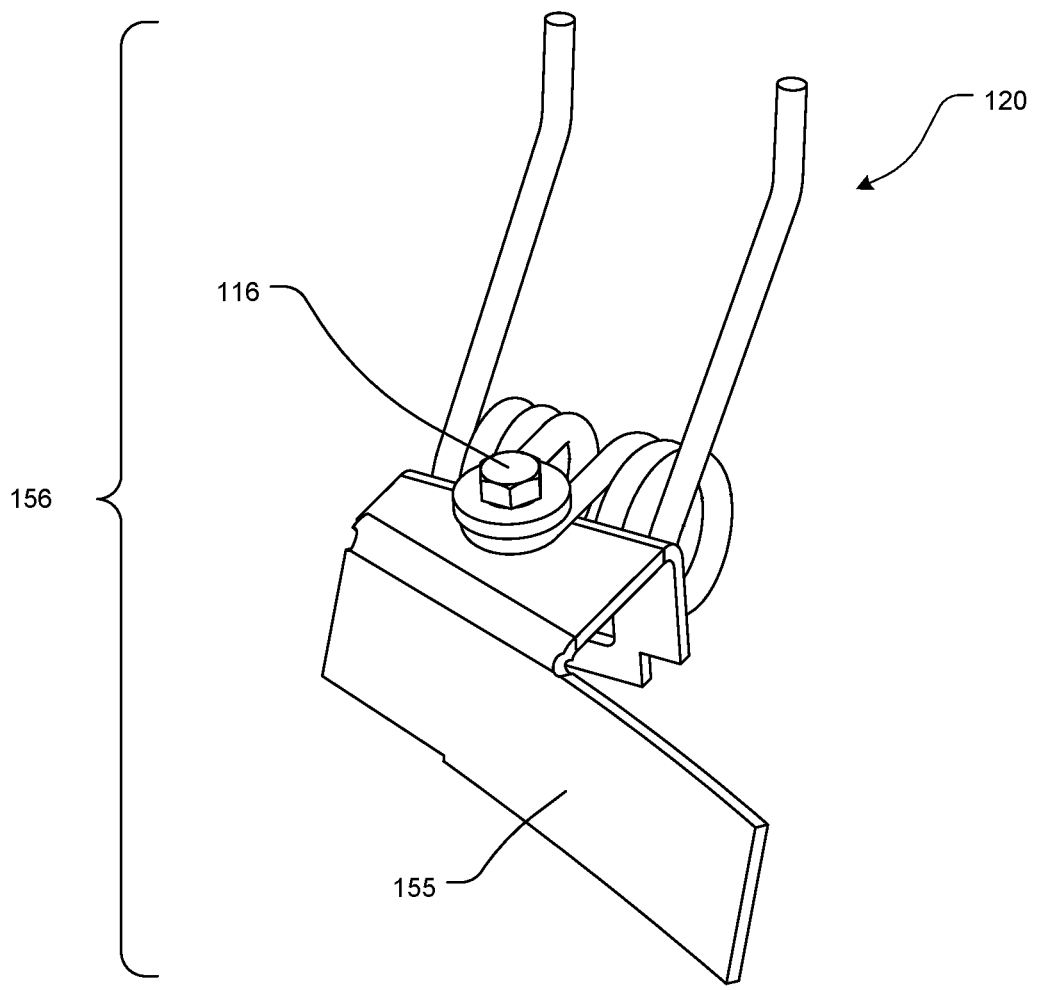
FIG. 8 illustrates a perspective view of an exemplary double torsional spring tine, fastening device, and element mounting cleat. When the previously described are combined they form a double torsional spring tine rotor element, according to the presently disclosed systems, methods, and/or apparatuses.
Figure 9:
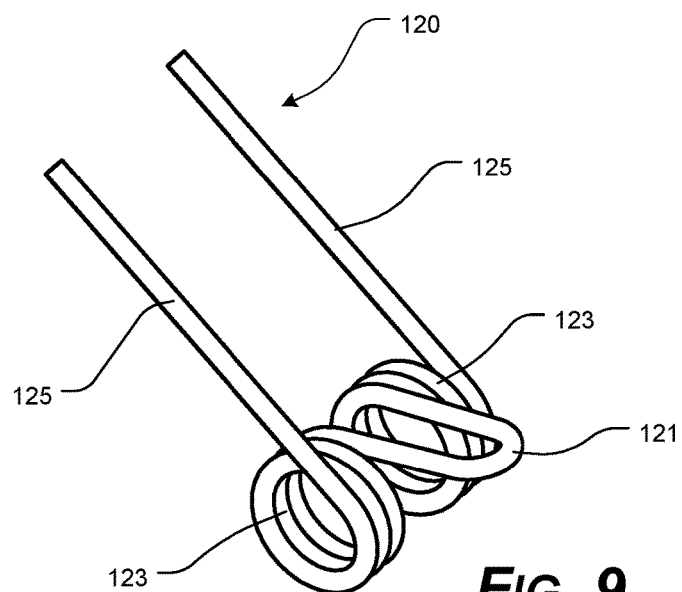
FIG. 9 illustrates a perspective view of an exemplary double torsional spring tine, according to the presently disclosed systems, methods, and/or apparatuses.
Figure 10:
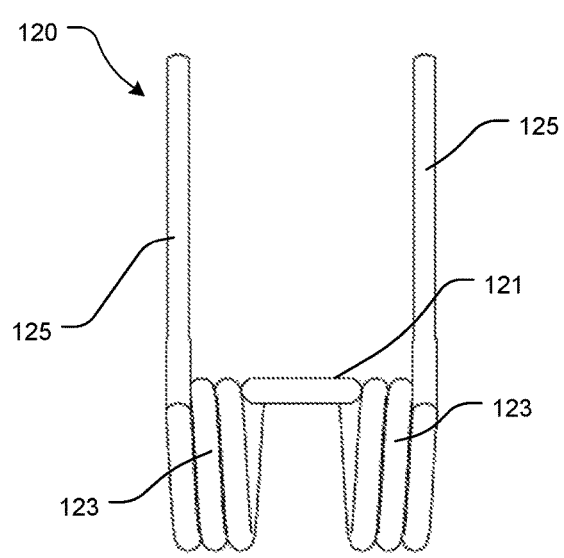
FIG. 10 illustrates a front view of an exemplary double torsional spring tine element, according to the presently disclosed systems, methods, and/or apparatuses.
Figure 11:
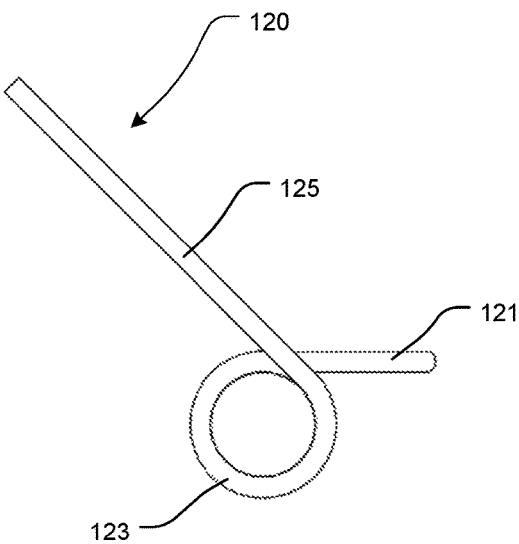
FIG. 11 illustrates a side view of an exemplary double torsional spring tine, according to the presently disclosed systems, methods, and/or apparatuses.

In various exemplary, non-limiting embodiments, as illustrated most clearly in FIGS. 5-7, each double torsional spring tine 120 comprises of one or more tines or tine fingers 125 that extend to tine finger extensions 127. In certain other exemplary, non-limiting embodiments, as illustrated most clearly in FIGS. 9-11, each double torsional spring tine 120 comprises of one or more tines or tine fingers 125, without the optional tine finger extensions 127.

If the tine finger extensions 127 are included, the tine finger extensions 127 extend from the tine fingers 125 at an angle that is substantially different from an angle of the tine fingers 125. Each tine finger 125 extends from a tine coil 123, which provides a spring biasing effect to each tine finger 125. The spring tine coils 123 are joined by a fastening loop 121. In certain exemplary embodiments, each double torsional spring tine 120 is attached or coupled to the element mounting cleat 155 proximate to the fastening loop 121. The double torsional spring tine 120 provide yielding, yet resilient elements, which are unique to axial threshing/separating as the double torsional spring tine 120 adjust to pressure generated from the crop mat. This allows both light and heavy crop loads to be threshed and separated with an equal degree of aggressiveness, while still allowing foreign materials to pass through the harvester 10 without producing damage to the harvester 10.

It should be understood that the spring rate and force may vary, based upon the amount of desired flex or resiliency of each double torsional spring tine finger 125. In these exemplary embodiments, the degree of flex or resiliency provided to each tine finger 125 may be provided by the inherent flex or resiliency of the material used to form the double torsional spring tine 120 and/or the tine fingers 125 or the size or shape of at least a portion of each tine finger 125.

The degree of flex or bias provided to each tine finger 125 and/or tine finger extension 127 is a design choice based upon the desired degree of the formation or flex of each tine finger 125 or tine finger extension 127.

A plurality of double torsional spring tines 120 attached or coupled to each elongated support element 112. In various exemplary embodiments, each double torsional spring tine 120 is included in a double torsional spring element and is attached or coupled to an elongated support element 112 via a fastening device 116. Together, the elongated support element, the double torsional spring tine 120, and fastening device 116 form a double torsional spring tine cylinder element 157 that is arranged in a pattern or series of patterns. In various exemplary embodiments, each tine attachment element 116 includes a bolt or other fastening device. Alternatively, each double torsional spring tine 120 may be attached or coupled to elongated support element via frictional engagement between the double torsional spring tine 120 and the elongated support elements 112, other attachment devices, adhesives, welding, or the like. In still other exemplary embodiments, each double torsional spring tine 120 may be formed as an integral extension of the elongated support element 112. One or more double torsional spring tines 120 may be fastened to an individual elongated support element in a pattern or series of patterns that can also create a double torsional spring tine cylinder element 157.

A plurality of double torsional spring tines 120 attached or coupled to each element mounting cleat 155. In various exemplary embodiments, each double torsional spring tine 120 is included in a double torsional spring element and is attached or coupled to an element mounting cleat 155, via a fastening device 116. Together, the element mounting cleat 155, the double torsional spring tine 120, and fastening device 116 form a double torsional spring tine rotor element 156 that is arranged in a pattern or series of patterns. In various exemplary embodiments, each tine attachment element 116 includes a bolt or other fastening device. Alternatively, each double torsional spring tine 120 may be attached or coupled to each element mounting cleat 155, via frictional engagement between the double torsional spring tine 120 and the element mounting cleat 155, other attachment devices, adhesives, welding, or the like. In still other exemplary embodiments, each double torsional spring tine 120 may be formed as an integral extension of the element mounting cleat 155.

In certain exemplary embodiments, double torsional spring tine 120 are attached to adjacent elongated support element 112 in a staggered or alternating configuration.

Once appropriately attached or coupled to each elongated support element 112, each double torsional spring tine 120 extends radially from the elongated support element 112. In various exemplary embodiments, each elongated support element 112 extends such that a longitudinal axis of each tine finger 125 is substantially perpendicular to a longitudinal axis of the elongated support element 112 to which it is attached or coupled.

Each spring tined axial rotor 130 is comprised of at least one input shaft 135, an inlet face wear plate 142, a flighting support frame 140, a leading flight segment 144, an intermediate flight support (mounting structure between 144 & 146) 145, a trailing flight segment 146, a rotor nose core 132, one or more helical element series 150, one or more main rotor cores 133, and a plurality of double torsional spring tine rotor elements 156.

In various exemplary, nonlimiting embodiments, the longitudinal axis of at least one of the axial rotors 130 may optionally be arranged so as to be parallel to the longitudinal axis of one or more additional axial rotors 130 (i.e., such that the longitudinal axes of the axial rotors 130 do not intersect, if extended). Alternatively, the longitudinal axis of at least one of the axial rotors 130 may optionally be arranged so as to be substantially parallel to the longitudinal axis of one or more additional axial rotors 130. The longitudinal axis of at least one of the axial rotors 130 is substantially parallel to the longitudinal axis of one or more additional axial rotors 130 if the longitudinal axes of the axial rotors 130 would intersect, if extended.

Thus, it should be appreciated that the axial rotors 130 may be arranged in parallel (as illustrated) or arranged such that the longitudinal axes of the axial rotors 130 diverge from one another as they move toward the rear of the harvester 10 or converge toward one another as they move toward the rear of the harvester 10.

Furthermore, the longitudinal axis of at least one of the axial rotors 130 may optionally be arranged so as to be coplanar to the longitudinal axis of one or more additional axial rotors 130. Alternatively, the longitudinal axis of at least one of the axial rotors 130 may optionally be arranged so as to be substantially coplanar to the longitudinal axis of one or more additional axial rotors 130. The longitudinal axis of at least one of the axial rotors 130 is substantially coplanar to a plane of the longitudinal axis of one or more additional axial rotors 130 if the planes of the longitudinal axes of the axial rotors 130 would intersect.

During rotation of the spring tined axial rotor 130, about the input shaft 135, the helically arranged surfaces of the leading flight segment 144, the intermediate flight support 145, the trailing flight segment 146, and the helical element series 150, causes materials that enter the spring tined axial rotor 130, via the inlet face wear plate 142, to be transitioned along the longitudinal axis of the spring tined axial rotor 130.

Figure 12:
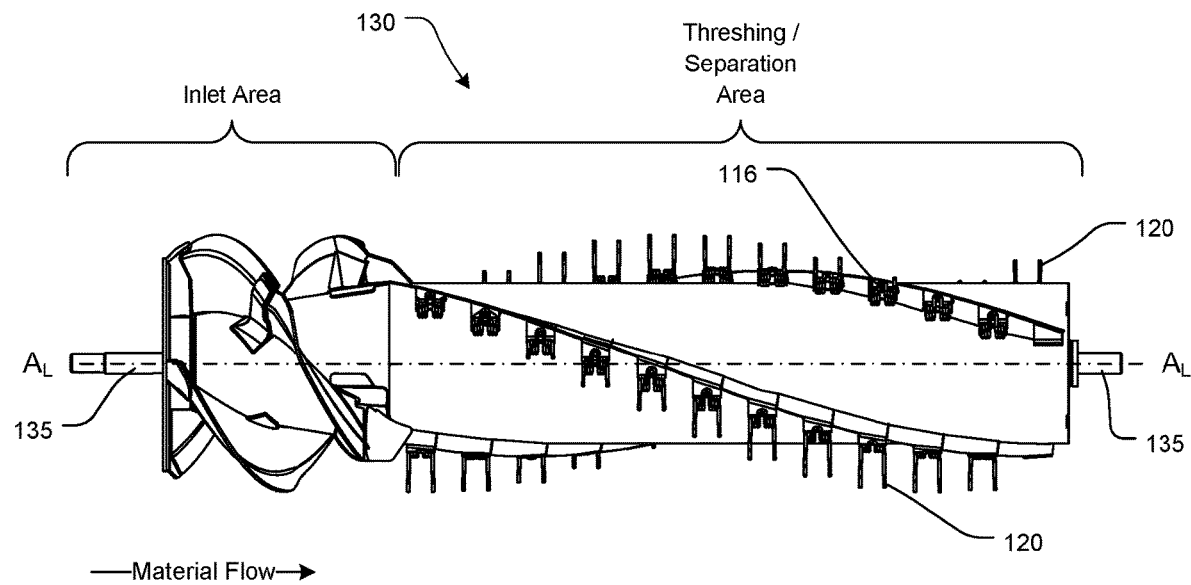
FIG. 12 illustrates a top view of an exemplary embodiment of a spring tined axial rotor, according to the presently disclosed systems, methods, and/or apparatuses.
Figure 13:
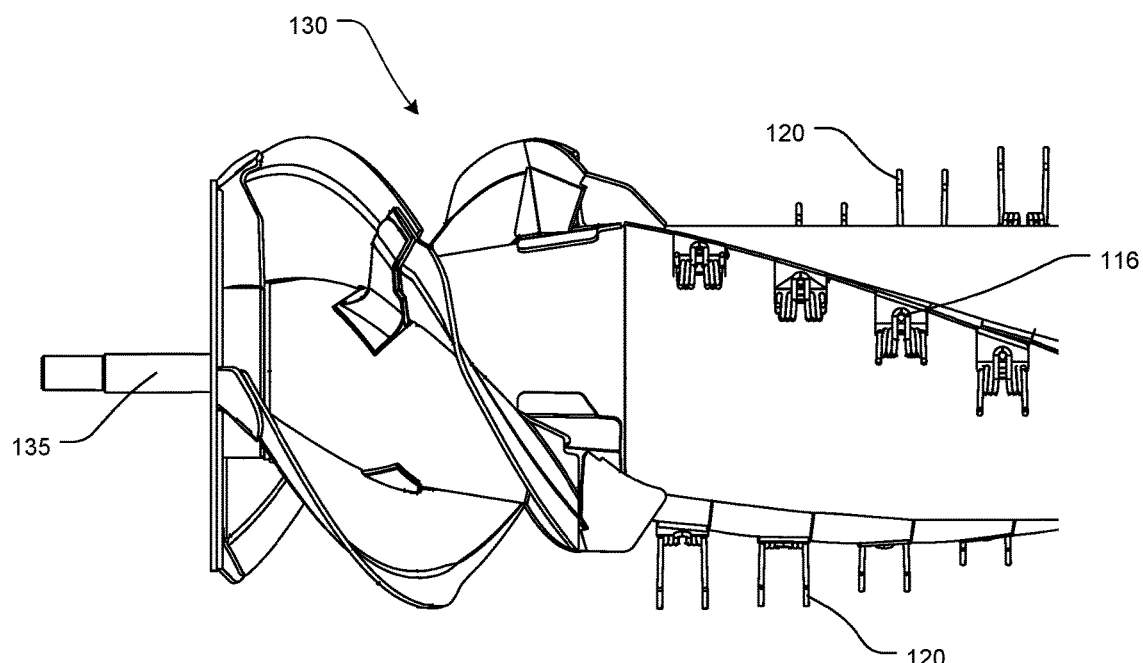
FIG. 13 illustrates a more detailed, top view of a portion of an exemplary embodiment of a spring tined axial rotor, according to the presently disclosed systems, methods, and/or apparatuses.
Figure 14:
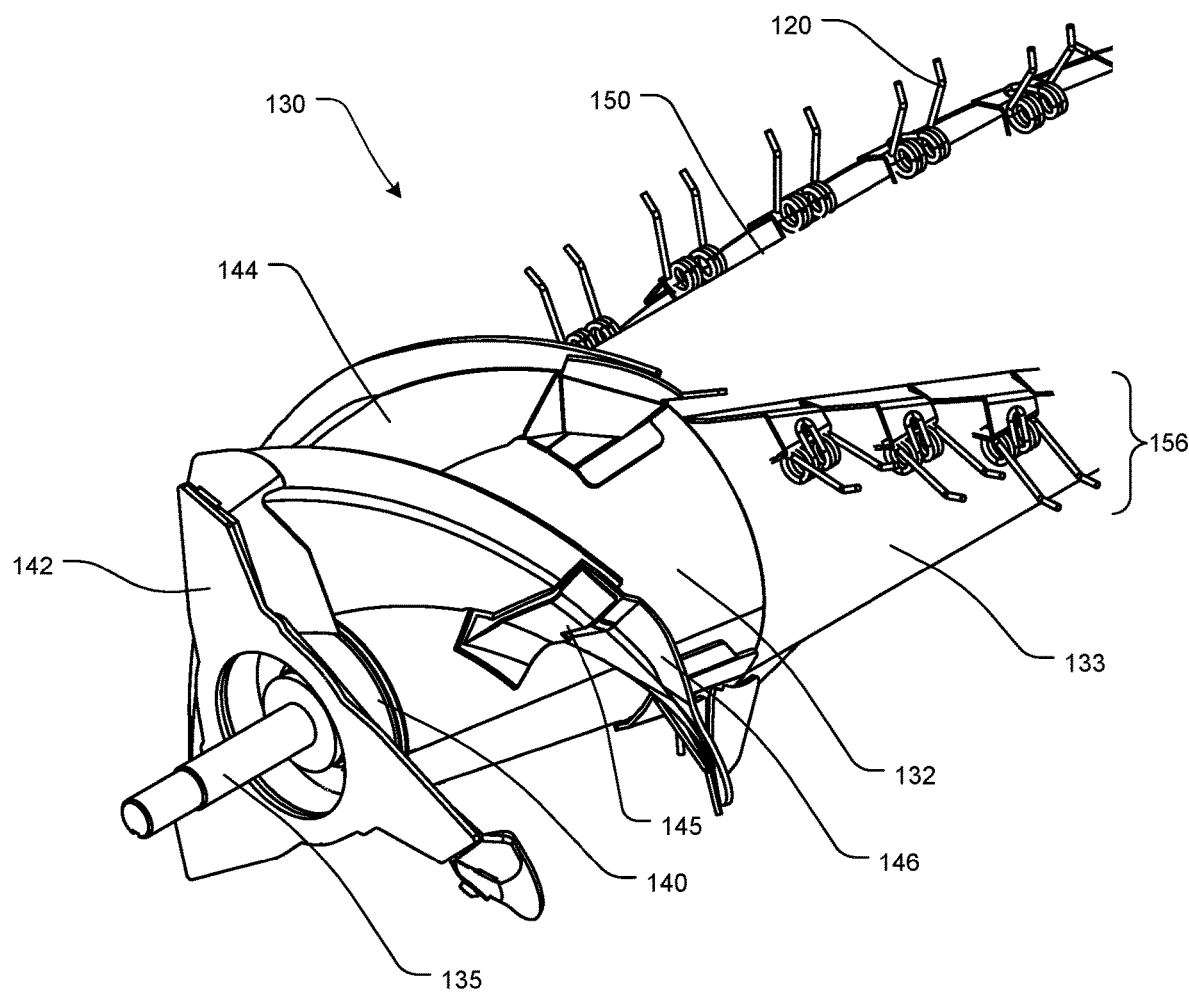
FIG. 14 illustrates a more detailed, perspective view of a portion of an exemplary embodiment of a spring tined axial rotor, according to the presently disclosed systems, methods, and/or apparatuses. Fastening devices omitted for clarity.
Figure 15:
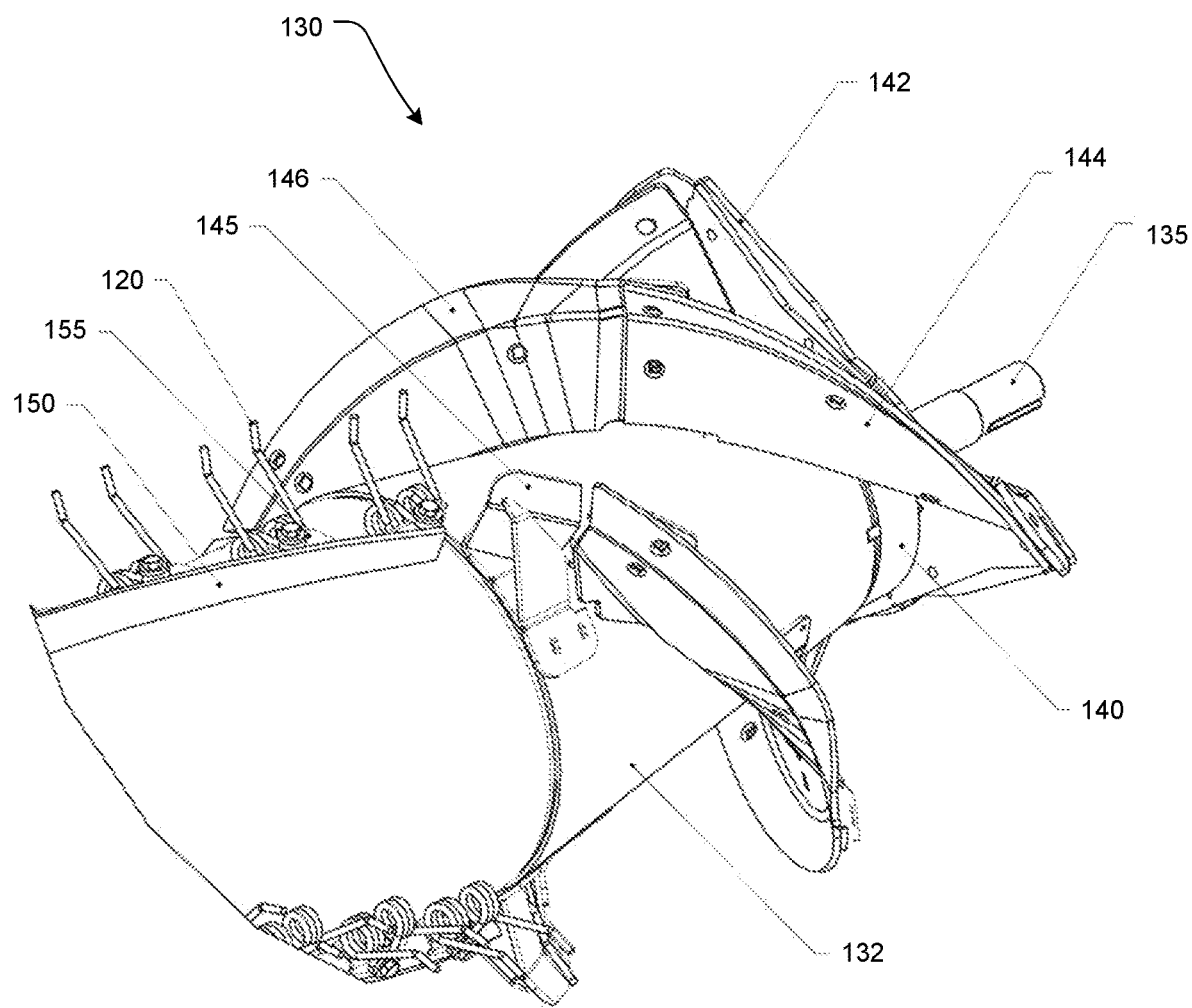
FIG. 15 illustrates a more detailed, perspective view of a portion of an exemplary embodiment of a spring tined axial rotor, according to the presently disclosed systems, methods, and/or apparatuses.

In various exemplary, non-limiting embodiments, as illustrated most clearly in FIGS. 12-14 the double torsional spring tine rotor elements 156 are arranged in a pattern or series of patterns (such as a helical or semi helical pattern) around each spring tined axial rotor 130. The double torsional spring tines 120 extend from the spring tined axial rotors 130 and the spring tined axial rotors 130 are spaced apart such that there is no interaction or interdigitation of adjacent or opposing double torsional spring tines 120.

As illustrated in FIGS. 18-22, the spring tined accelerator cylinder 100 is positioned such that a longitudinal axis of the spring tined accelerator cylinder 100 is substantially perpendicular to the direction of travel of the harvester. The spring tined accelerator cylinder 100 is positioned such that the longitudinal axis of the spring tined axial rotor 130 is substantially parallel to the longitudinal axis of any adjacent pre-conditioning preconditioning cylinders 160 positioned in front of the spring tined accelerator cylinder 100. The spring tined axial rotors 130 are positioned such that their longitudinal axes are substantially parallel to the direction of motion of the harvesting device.

During use of the spring tined accelerator cylinder 100 and the spring tined axial rotor 130 within a harvester 10 for harvesting peanuts, the harvester 10 is operated to remove peanut pods from peanut vines that have been dug and windrowed. Once separated and cleaned, the peanuts are conveyed into a peanut storage basket and vine material is passed out of the harvester 10. In various exemplary embodiments, the harvester 10 is pulled and powered by a farm tractor.

As the harvester 10 is operated, a header pickup 195 of the harvester 10 lifts the peanuts and vines off of the ground. A header auger 196 of the harvester 10 feeds the peanuts and vines into the preconditioning cylinders 160. The preconditioning cylinders 160 precondition the vines into an even crop mat. One or more perforated, concave floors 170 are positioned below the preconditioning cylinders 160, such that extracted dirt can fall through the concave floors 170.

In various exemplary embodiments, adjustable overhead teeth positioned over one or more of the preconditioning cylinders 160 can be used to control the aggressiveness of the pre-conditioning performed by the action of the preconditioning cylinders 160. Once appropriately pre-conditioned, the spring tined accelerator cylinder 100 operates to feed the conditioned crop mat through the spring tined axial rotor inlet 12 of the harvester 10 and into the spring tined axial rotors 130.

The spring tined axial rotors 130 serve to perform the main threshing and initial separation of the crop. In various exemplary embodiments, extraction concaves 180 surround at least a portion of the spring tined axial rotors 130. The concaves 180 are components mounted about the axis of a cylinder or rotor (either above, below or around) which aid in crop movement as well as threshing and separating. During operation, centrifugal force generated by rotation of the spring tined axial rotors 130 separate the pods from the vines. Optional vaned top covers 190 may be utilized to promote rearward movement of the vine material. The threshed vine is discharged at the end of the spring tined axial rotors 130 and peanut pods expelled through the axial rotor extraction concaves 180 are directed onto the front of a disc separator by an oscillating slide system.

Figure 16:
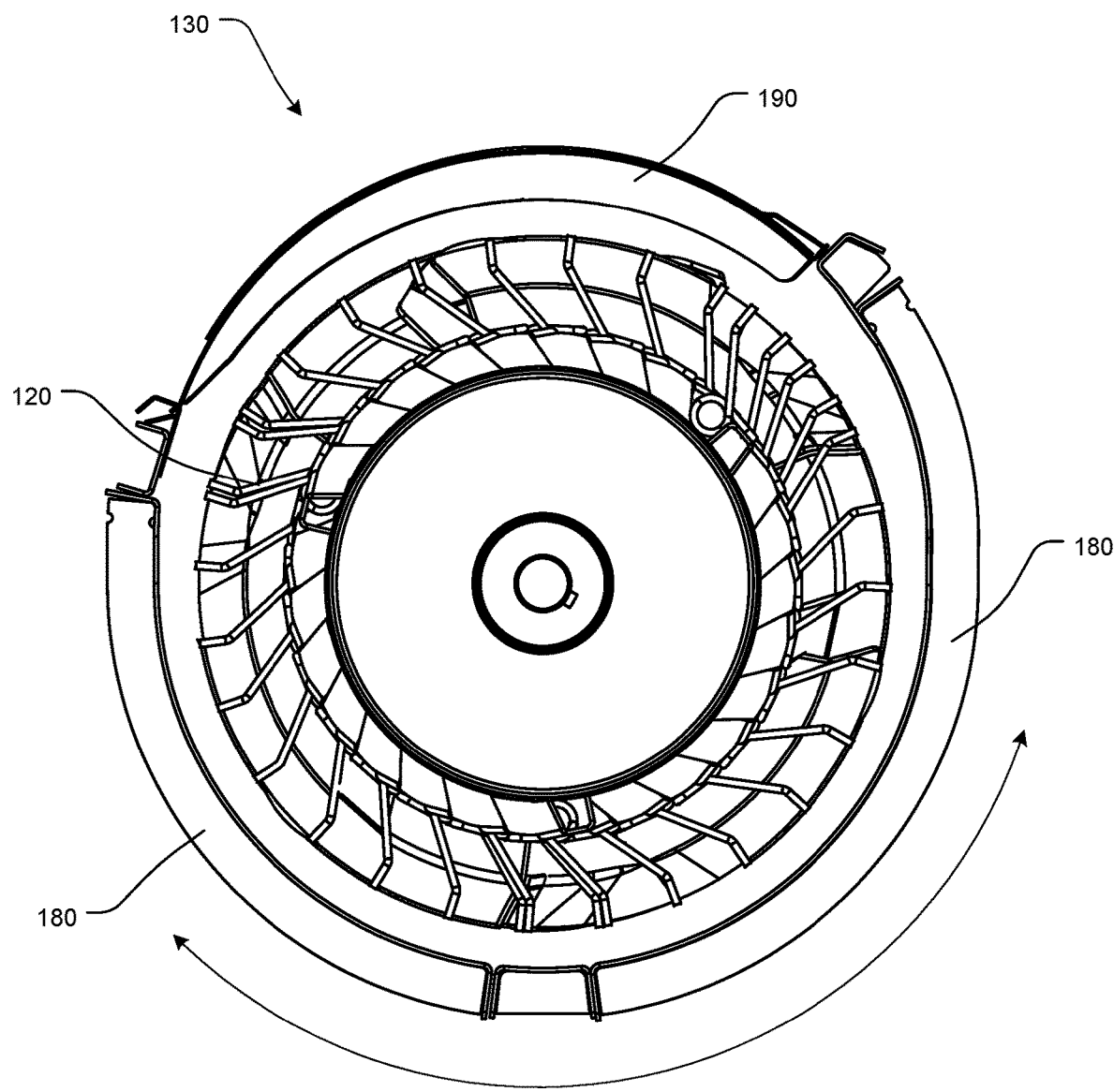
FIG. 16 illustrates an end view of a portion of an exemplary embodiment of a spring tined axial rotor with a perimeter structure according to the presently disclosed systems, methods, and/or apparatuses.
Figure 17:
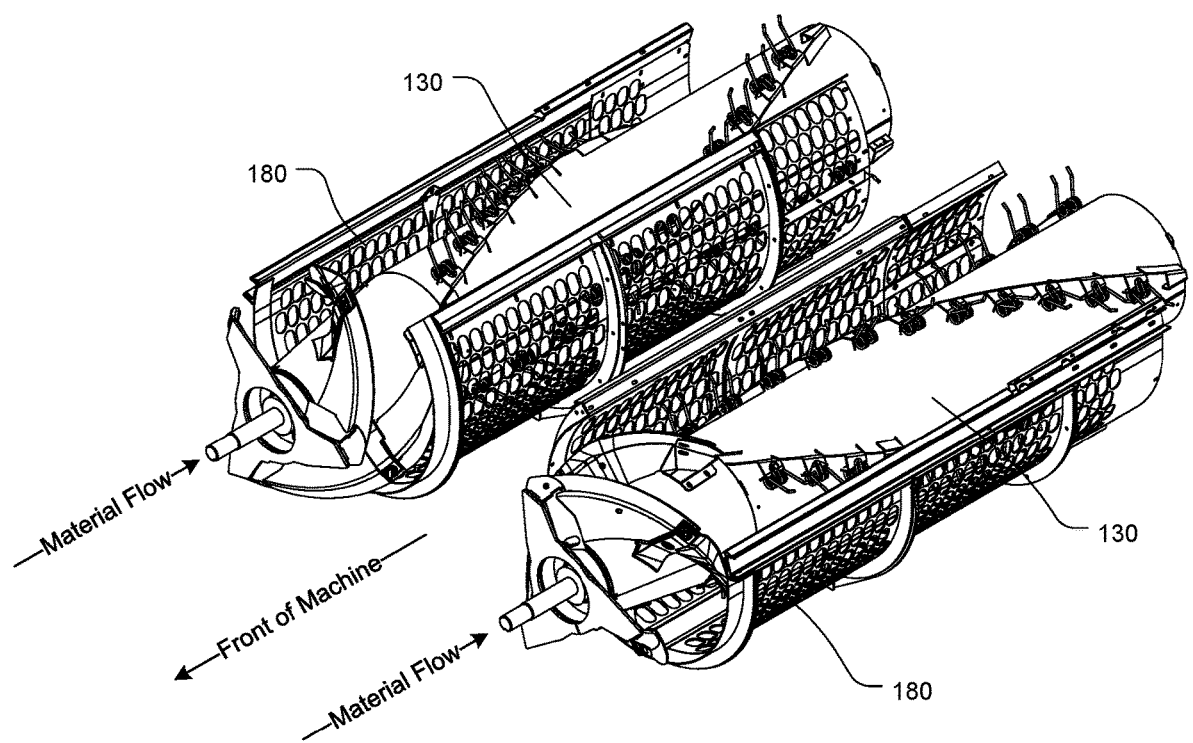
FIG. 17 illustrates a perspective view of two spring tined axial rotors, aligned with one another, according to the presently disclosed systems, methods, and/or apparatuses.
Figure 18:
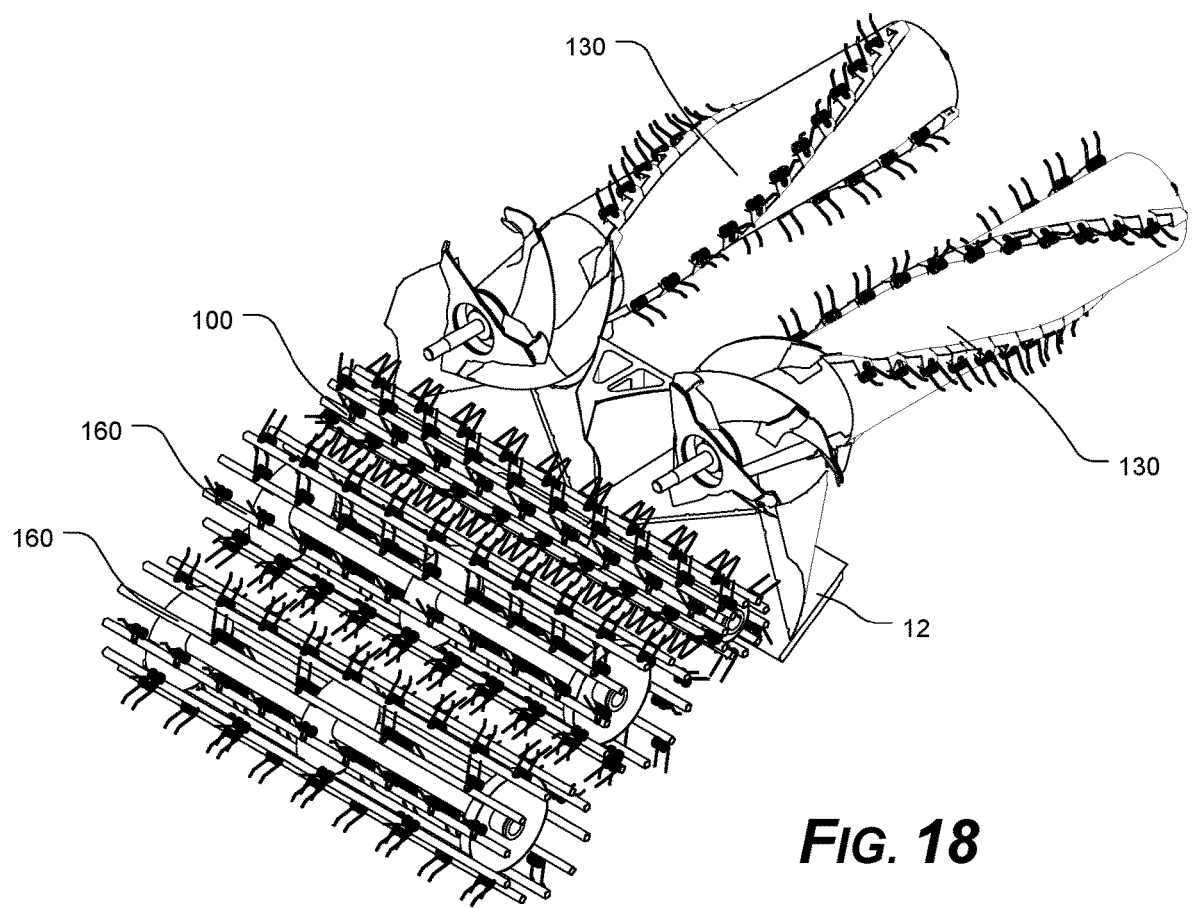
FIG. 18 illustrates a perspective view of two spring tined axial rotors, a spring tined accelerator cylinder, and two preconditioning cylinders aligned with one another, according to the presently disclosed systems, methods, and/or apparatuses.
Figure 19:
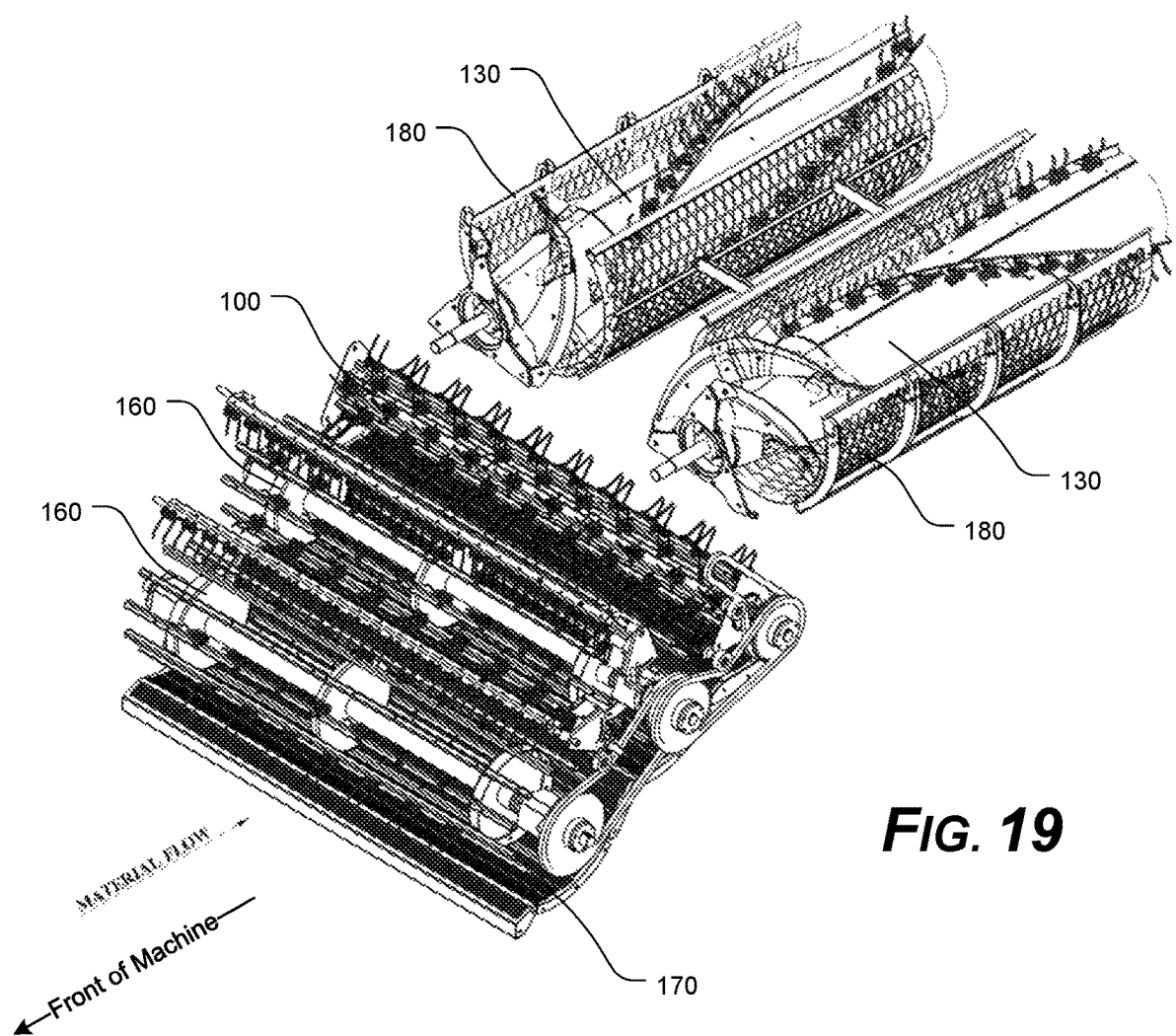
FIG. 19 illustrates a perspective view of two spring tined axial rotors, a spring tined accelerator cylinder, and two preconditioning cylinders aligned with one another, according to the presently disclosed systems, methods, and/or apparatuses.
Figure 20:
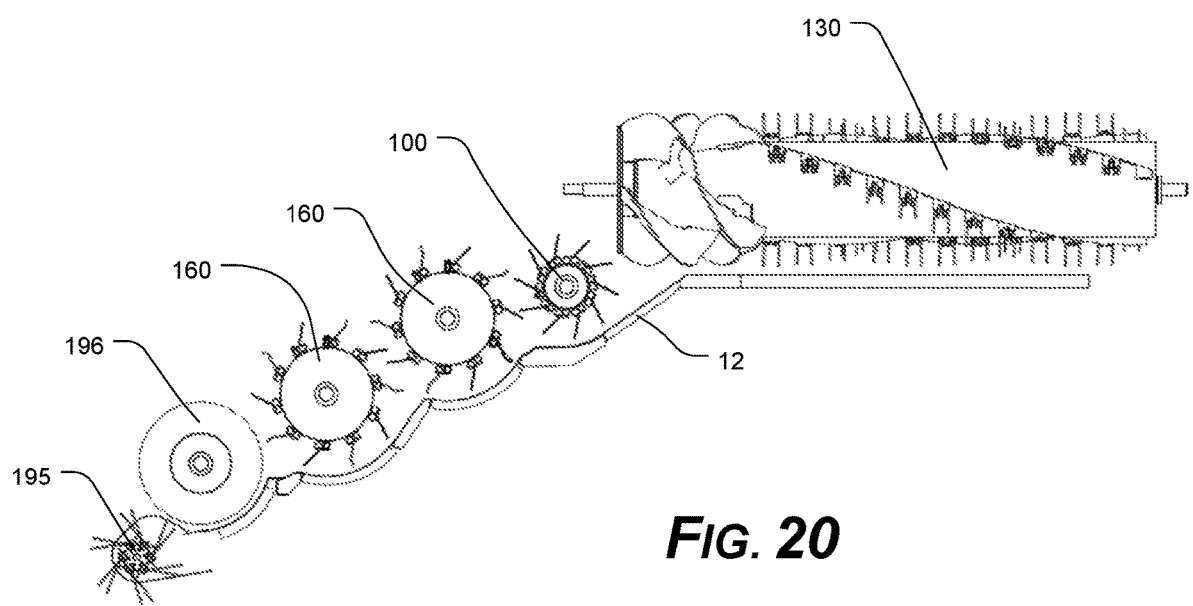
FIG. 20 illustrates a side view of a spring tined axial rotor, a spring tined accelerator cylinder, two preconditioning cylinders, a header pickup, and a header auger, aligned with one another, according to the presently disclosed systems, methods, and/or apparatuses.
Figure 21:
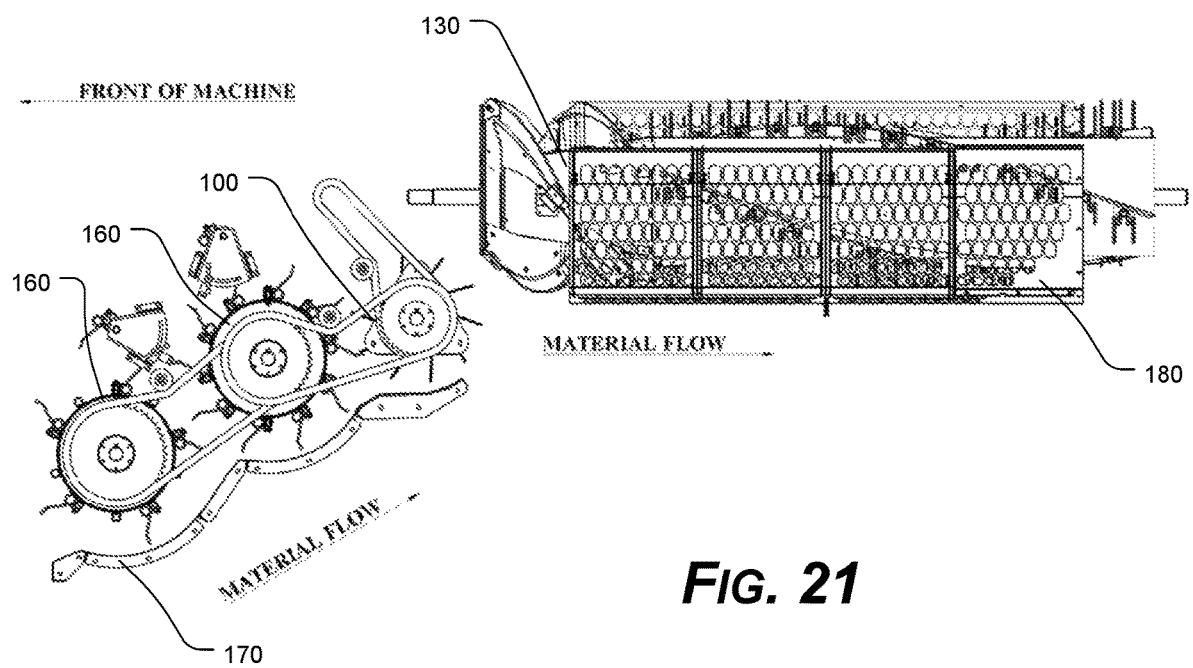
FIG. 21 illustrates a side view of two spring tined axial rotors, a spring tined accelerator cylinder, and two preconditioning cylinders aligned with one another, according to the presently disclosed systems, methods, and/or apparatuses.
Figure 22:
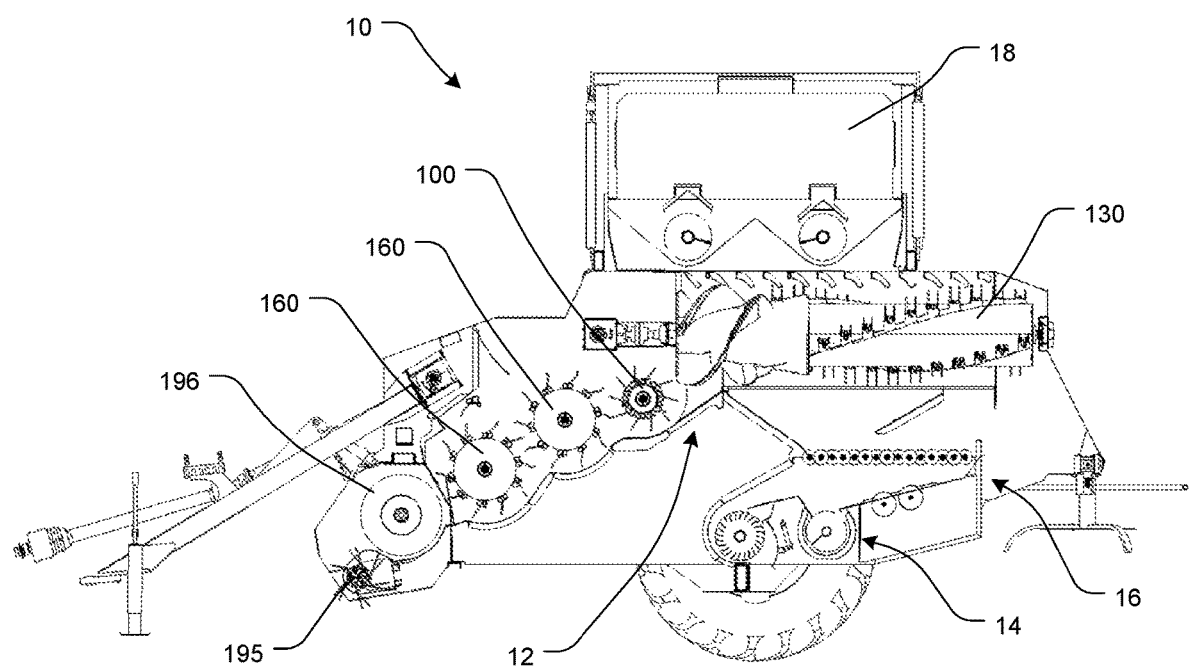
FIG. 22 illustrates a diagram of an exemplary harvester incorporating certain exemplary elements of the presently disclosed systems, methods, and/or apparatuses.
Figure 23:
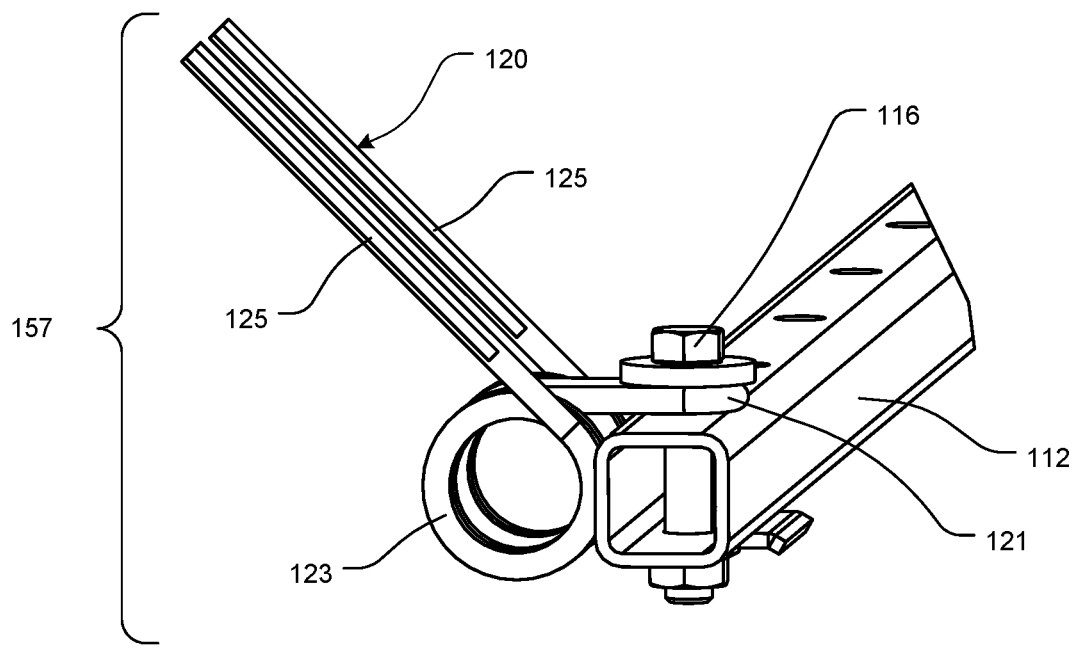
FIG. 23 illustrates a perspective view of an exemplary one or more double torsional spring tine(s), fastening device, and elongated support element. When the previously described are combined they form a double torsional spring tine cylinder element, according to the presently disclosed systems, methods, and/or apparatuses. Only a single double torsional spring tine is depicted.
Figure 24:
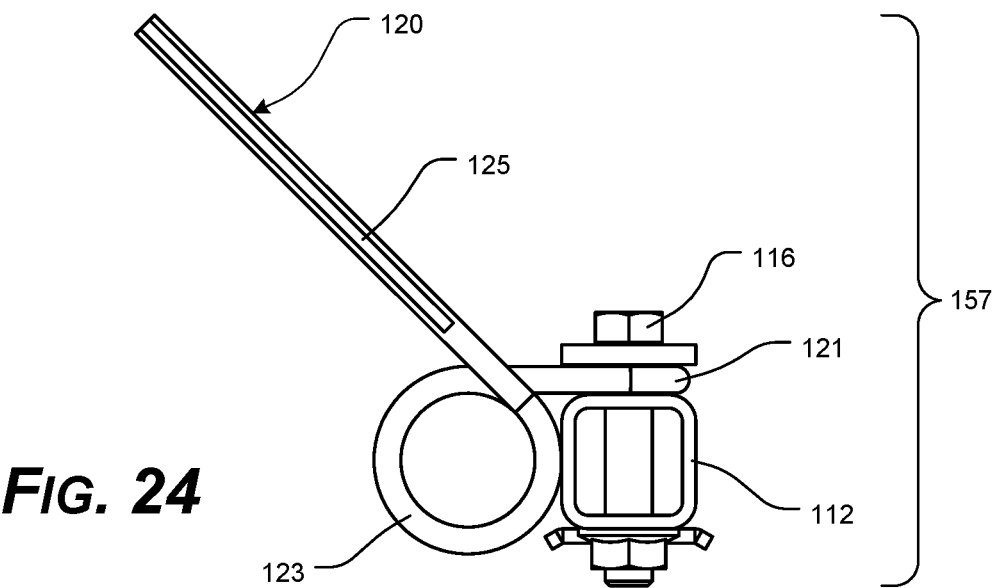
FIG. 24 illustrates a side view of an exemplary double torsional spring tine cylinder element, according to the presently disclosed systems, methods, and/or apparatuses.

The concaves 180 may optionally be mounted so as to be stationary or so as to rotate with or relative to the spring tined axial rotors 130, as illustrated by the curved arrow in FIG. 16.

During further processing of the peanut pods, a cleaning fan agitates the material on a disc separator to aid in separation and blows light material such as leaves, immature or diseased peanuts, and other light trash over the tail board and out of the back of the harvester 10. The higher density good pods fall through the final disc separator 16 to a stemmer section, while vine material and sticks advance across the disc separator and out of the back of the harvester 10. As the good pods fall into the stemmer saws, their stems are removed. Cleaned peanuts fall into a collection auger system 14 and are conveyed into an elevator air system, which sends the cleaned peanuts to a storage bin or basket 18.

While the presently disclosed systems, methods, and/or apparatuses have been described in conjunction with the exemplary embodiments outlined above, the foregoing description of exemplary embodiments of the presently disclosed systems, methods, and/or apparatuses, as set forth above, are intended to be illustrative, not limiting, and the fundamental disclosed systems, methods, and/or apparatuses should not be considered to be necessarily so constrained. It is evident that the presently disclosed systems, methods, and/or apparatuses are not limited to the particular variation set forth and many alternatives, adaptations, modifications, and/or variations will be apparent to those skilled in the art.

Furthermore, where a range of values is provided, it is understood that every intervening value, between the upper and lower limit of that range and any other stated or intervening value in that stated range is encompassed within the presently disclosed systems, methods, and/or apparatuses. The upper and lower limits of these smaller ranges may independently be included in the smaller ranges and is also encompassed within the presently disclosed systems, methods, and/or apparatuses, subject to any specifically excluded limit in the stated range. Where the stated range includes one or both of the limits, ranges excluding either or both of those included limits are also included in the presently disclosed systems, methods, and/or apparatuses.

It is to be understood that the phraseology of terminology employed herein is for the purpose of description and not of limitation. Unless defined otherwise, all technical and scientific terms used herein have the same meaning as commonly understood by one of ordinary skill in the art to which the presently disclosed systems, methods, and/or apparatuses belongs.

In addition, it is contemplated that any optional feature of the inventive variations described herein may be set forth and claimed independently, or in combination with any one or more of the features described herein.

Accordingly, the foregoing description of exemplary embodiments will reveal the general nature of the presently disclosed systems, methods, and/or apparatuses, such that others may, by applying current knowledge, change, vary, modify, and/or adapt these exemplary, non-limiting embodiments for various applications without departing from the spirit and scope of the presently disclosed systems, methods, and/or apparatuses and elements or methods similar or equivalent to those described herein can be used in practicing the presently disclosed systems, methods, and/or apparatuses. Any and all such changes, variations, modifications, and/or adaptations should and are intended to be comprehended within the meaning and range of equivalents of the disclosed exemplary embodiments and may be substituted without departing from the true spirit and scope of the presently disclosed systems, methods, and/or apparatuses.

Also, it is noted that as used herein and in the appended claims, the singular forms "a", "and", "said", and "the" include plural referents unless the context clearly dictates otherwise. Conversely, it is contemplated that the claims may be so-drafted to require singular elements or exclude any optional element indicated to be so here in the text or drawings. This statement is intended to serve as antecedent basis for use of such exclusive terminology as "solely", "only", and the like in connection with the recitation of claim elements or the use of a "negative" claim limitation(s).

What is claimed is:

1. A harvester with a threshing system comprising:
    one or more preconditioning cylinder(s) mounted in an orientation such that a longitudinal axis of each of said one or more preconditioning cylinder(s) is substantially perpendicular to a direction of travel of said harvester, wherein each of said one or more preconditioning cylinder(s) includes a plurality of double torsional spring tine elements attached or coupled to a portion of each of said one or more preconditioning cylinder(s);

at least one accelerator cylinder mounted in an orientation such that a longitudinal axis of said at least one accelerator cylinder is substantially perpendicular to said direction of travel of said harvester, wherein said at least one accelerator cylinder includes a plurality of double torsional spring tine elements attached or coupled to said accelerator cylinder; and two or more axial rotors mounted in an orientation such that a longitudinal axis of each of said axial rotors is substantially parallel to said direction of travel of said harvester, wherein each of said axial rotors is aligned such that said longitudinal axis of each of said axial rotors is substantially coplanar and substantially parallel to said longitudinal axis of each other of said axial rotors, and wherein each of said axial rotors includes a plurality of double torsional spring tine rotor elements attached or coupled to each of said axial rotors in a helical pattern around at least a portion of each of said axial rotors.

2. The harvester of claim 1, wherein said preconditioning cylinder(s) are oriented above one or more perforated concave floor(s), wherein said perforated concave floor(s) direct a crop mat through said harvester.

3. The harvester of claim 1, wherein said at least one accelerator cylinder comprises a core that supports said double torsional spring tine elements.

4. The harvester of claim 3, wherein said core of said at least one accelerator cylinder is attached or coupled to an input shaft wherein said input shaft extends through a longitudinal axis of said at least one accelerator cylinder.

5. The harvester of claim 1, wherein said at least one accelerator cylinder is comprised of a core, and wherein said at least one accelerator cylinder is attached or coupled to an input shaft through said longitudinal axis of said at least one accelerator cylinder, and the plurality of double torsional spring tine elements extend from said accelerator cylinder core.

6. The harvester of claim 1, wherein at least some of said plurality of double torsional spring tine elements attached or coupled to said accelerator cylinder engage a portion of a crop mat to progressively or incrementally apply a force to said crop mat or other opposing objects as said plurality of double torsional spring tine elements attached or coupled to said accelerator cylinder flex.

7. The harvester of claim 6, wherein said at least one accelerator cylinder is positioned so as to allow said double torsional spring tine cylinder elements of said at least one accelerator cylinder to convey and accelerate said crop mat to said axial rotor(s).

8. The harvester of claim 1, wherein one or more of said double torsional spring tine rotor elements is/are mounted on a perimeter of a main rotor core of one of said axial rotors.

9. The harvester of claim 8, wherein said double torsional spring tine rotor elements are mounted in a pattern or series of patterns on said main rotor core.

10. The harvester of claim 8, wherein said double torsional spring tine rotor elements are mounted to one of said axial rotors tangentially and substantially perpendicular to said longitudinal axis of said axial rotor.

11. The harvester of claim 1, wherein said double torsional spring tine rotor elements progressively adjust to pressure generated from a crop mat while allowing foreign materials to pass.

12. The harvester of claim 1, wherein each of said axial rotors comprises a main rotor core, and wherein said axial rotor is attached or coupled to an input shaft parallel to said longitudinal axis of said axial rotor, and wherein the plurality of double torsional spring tine rotor elements extend from said main rotor core.

13. A harvester with a threshing system comprising:
one or more preconditioning cylinder(s), wherein each of said one or more preconditioning cylinder(s) includes a plurality of double torsional spring tine elements attached or coupled to a portion of each of said one or more preconditioning cylinder(s);

at least one accelerator cylinder mounted in an orientation such that a longitudinal axis of said at least one accelerator cylinder is substantially parallel to a longitudinal axis of said one or more preconditioning cylinder(s), wherein said at least one accelerator cylinder includes a plurality of double torsional spring tine elements attached or coupled to said accelerator cylinder; and two or more axial rotors mounted in an orientation such that a longitudinal axis of each of said axial rotors is substantially perpendicular to said longitudinal axis of said at least one accelerator cylinder, and wherein each of said axial rotors includes a plurality of double torsional spring tine rotor elements attached or coupled to each of said axial rotors in a helical pattern around at least a portion of each of said axial rotors.

* * * * *